UNITED STATES PATENT OFFICE.

PAUL R. HERSHMAN, OF CHICAGO, ILLINOIS, ASSIGNOR TO THE MINERAL PRODUCTS COMPANY, OF NEW YORK, N. Y., A CORPORATION OF WEST VIRGINIA.

REDUCTION OF METALLIC OXIDS.

1,273,220.     Specification of Letters Patent.     Patented July 23, 1918.

No Drawing.     Application filed December 21, 1914. Serial No. 878,312.

*To all whom it may concern:*

Be it known that I, PAUL R. HERSHMAN, a citizen of the Empire of Austria-Hungary, residing in the city of Chicago, county of Cook, State of Illinois, have invented certain new and useful Improvements in the Reduction of Metallic Oxids; and I do hereby declare the following to be a full, clear, and exact description of the invention, such as will enable others skilled in the art to which it appertains to make and use the same.

The present invention is based upon the discovery that oxid of aluminum, which is generally considered as non-reducible to metal by carbon alone, or at most but partially in the electric arc, can be converted into metal, at temperatures of approximately 2200° C., if the reduction is effected by carbids, or by oxids which in the presence of carbon, form carbids at lower temperatures than the temperature of reduction, and particularly under the following conditions:

First—that substances be present which lower the fusing point of the aluminum oxid, as, for instance, even small amounts of silica;

Secondly — that the carbon monoxid formed in the reaction be quickly removed, in order that neither its carbon nor its oxygen shall act upon the metal reduced, to reconvert it into carbid or oxid;

Thirdly — that the reduced metal be quickly removed while still in a fluid state;

Fourthly—that small amounts of finely-divided heat conductors be added, *e. g.*, finely divided aluminum or other finely divided metals; and Fifthly—that the reaction be carried out in the presence of hydrocarbon gases, or free hydrogen, or both.

The invention may be carried into effect as follows:

The alumina is mixed with the necessary amount of a suitable carbid, as, for instance, silicon carbid, or a carbid or carbids of the alkaline earth metals (four molecules of alumina to three molecules of carbid). With this mixture is likewise associated a small amount of aluminum dust, which latter is a commercial by-product obtainable at very low prices. Instead of the carbids, there may be employed in the mixture a corresponding amount of silica and carbon, or a corresponding amount of alkaline earth metal oxid and carbon, the carbon being in a finely divided form, preferably as tar or pitch. So also, instead of the aluminum dust a corresponding amount of a metallic oxid readily reducible to metal by carbon may be employed together with the necessary amount of carbon for effecting such reduction. Thus, copper oxid, which is readily reducible by carbon may be employed. The aluminum dust, or copper or the like, serve to act as heat conductors for facilitating the completeness and the speed of the reaction.

The mass is thereupon pressed into a coherent condition, in an electric furnace, preferably of the vertical resister type or of the vertical arc type, that is to say, a furnace wherein the electric current traverses the mass in a vertical direction. It is then heated as quickly as possible to a fluid condition and the temperature is even raised somewhat higher (say 100° C. higher) so that it finally attains about 2200° C. To assist the favorable progress of the operation, hydrocarbon gases, hydrogen, or both, may be admitted, these gases having no carburizing effect upon the metal formed, and hydrogen seeming to have a catalytic effect in favoring the reaction.

If silica and carbon are employed, aluminum alloys containing more or less of silicon are formed. The amount of silicon taken up by the aluminum can, however, be materially reduced if the temperature necessary for the reduction of the alumina is reached as quickly as possible and the aluminum formed is tapped off as soon as possible after its production.

When a heat-conducting metal other than aluminum is employed to assist the operation (either in the metallic state, or in the form of a metallic oxid such as copper oxid readily reducible by carbon to metal,) it is preferably used in the proportion necessary to form a eutectic with the aluminum obtained by the reduction of the alumina.

What I claim is:

1. The method of reducing alumina to metal, which comprises mixing the alumina with carbids, and bringing the mixture to a fluid condition by heating to a temperature of about 2200° C., thereby reducing the alumina to the metallic state.

2. The method of reducing alumina to metal, which comprises mixing alumina with carbids, bringing the mixture to a fluid condition by heat, and quickly and positively removing from the mixture the gaseous products of the reaction thereby reducing the alumina to the metallic state.

3. The method of reducing alumina to metal, which comprises mixing the alumina with silicon carbid, and bringing the mixture to a fluid condition by heat, thereby reducing the alumina to the metallic state.

4. The method of reducing alumina to metal, which comprises mixing the alumina with silicon carbid, bringing the mixture to a fluid condition by heat, and quickly and positively removing from the mixture the gaseous products of the re-action thereby reducing the alumina to the metallic state.

In testimony whereof I affix my signature, in presence of two witnesses.

PAUL R. HERSHMAN.

Witnesses:
M. AMES,
M. A. BELL.